Sept. 28, 1965     H. L. FOX ETAL     3,208,462
FLUID CONTROL APPARATUS
Filed Sept. 14, 1962     4 Sheets-Sheet 1

INVENTORS
HAROLD L. FOX
GALE H. THORNE SR.
BY
ATTORNEY

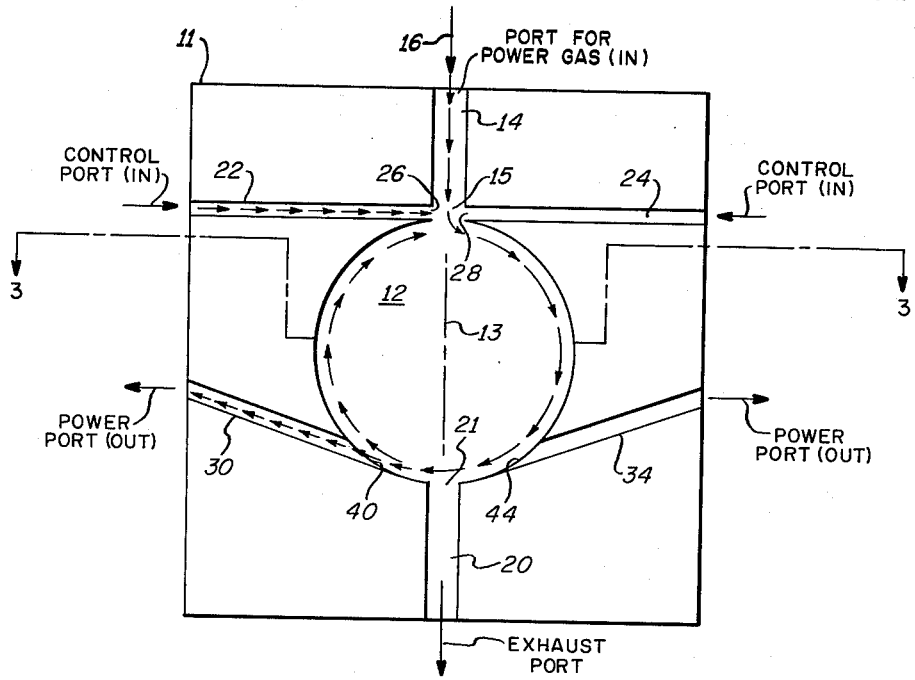
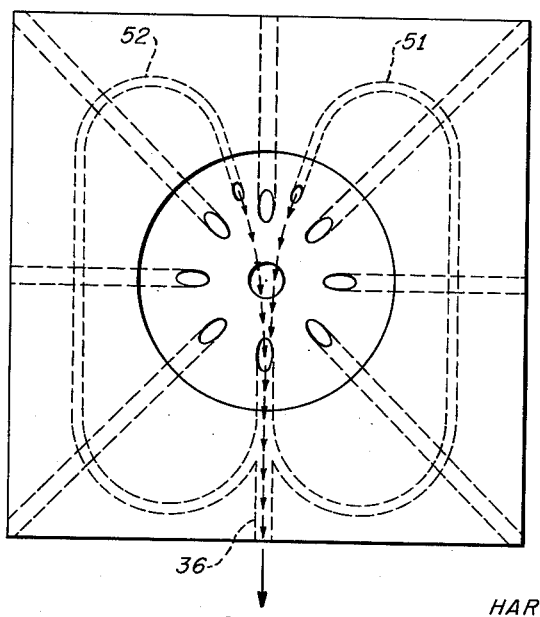

INVENTORS
HAROLD L. FOX
GALE H. THORNE SR.
BY
ATTORNEY

Sept. 28, 1965  H. L. FOX ETAL  3,208,462
FLUID CONTROL APPARATUS
Filed Sept. 14, 1962  4 Sheets-Sheet 4

INVENTORS
HAROLD L. FOX
GALE H. THORNE SR.
BY
ATTORNEY

United States Patent Office 3,208,462
Patented Sept. 28, 1965

3,208,462
FLUID CONTROL APPARATUS
Harold L. Fox and Gale H. Thorne, Sr., Salt Lake City, Utah, assignors to Sperry Rand Corporation, Great Neck, N.Y., a corporation of Delaware
Filed Sept. 14, 1962, Ser. No. 223,798
13 Claims. (Cl. 137—81.5)

The present invention relates to fluid control apparatus wherein the flow of a primary fluid is controlled by means of an auxiliary fluid.

The present invention utilizes boundary layer phenomenon and momentum phenomena to produce a fluid vortex within a cavity by means of a primary fluid flow that is caused to deviate from its normal direction in accordance with an auxiliary fluid flow. The walls of the cavity cooperate with the auxiliary fluid flow to define the primary fluid flow path in order that the primary fluid may be selectively controlled to flow in one of a plurality of planes while eliminating the necessity for moving parts to define the direction of or to control the fluid flow.

It is an object of the present invention to provide fluid control apparatus which controls fluid flow without utilizing moving parts.

It is another object of the present invention to provide fluid control apparatus which may be utilized in lieu of electrical apparatus.

It is a further object of the present invention to provide a universal digital logic device utilizing fluid flow phenomenon for its operation.

It is an additional object of the present invention to provide a fluid control apparatus which produces control functions without requiring any moving parts.

The above objects are achieved by a fluid control apparatus comprising an element having disposed therein a cavity having an axis wherein a primary fluid flows through the element and into the cavity in the direction of the axis and a control signal fluid is selectively adapted to flow through the element for selectively controlling the direction of the primary fluid radially with respect to the axis in one of a plurality of directions.

The control signal fluid flow and the cavity cooperate to define the direction and path of the primary fluid flow in any one of a plurality of planes which includes the axis. Fluid outlet means are in communication with the cavity and disposed in a predetermined plurality of planes. The primary fluid is selectively controlled to flow through the fluid outlet means in accordance with the flow of the control signal fluid.

Figure 1:
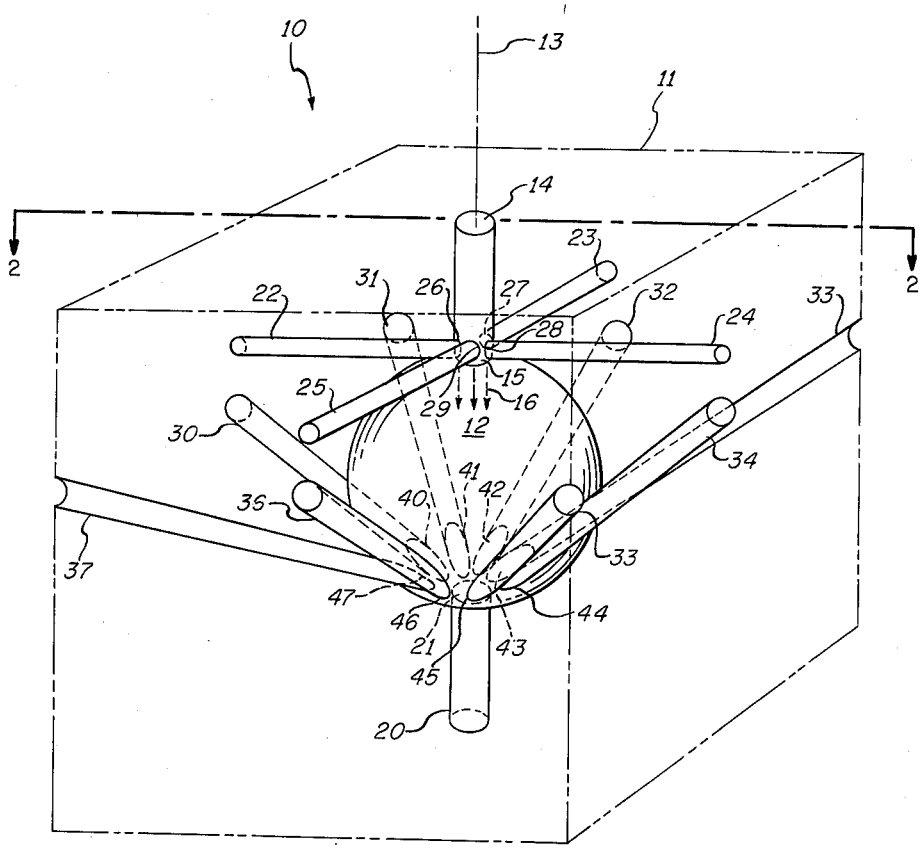
Figure 4:
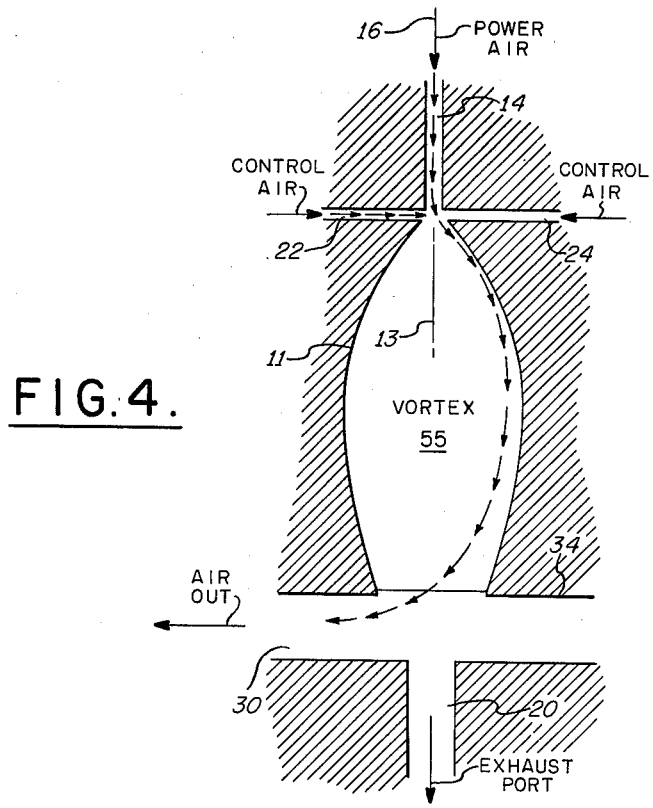
Figure 5:
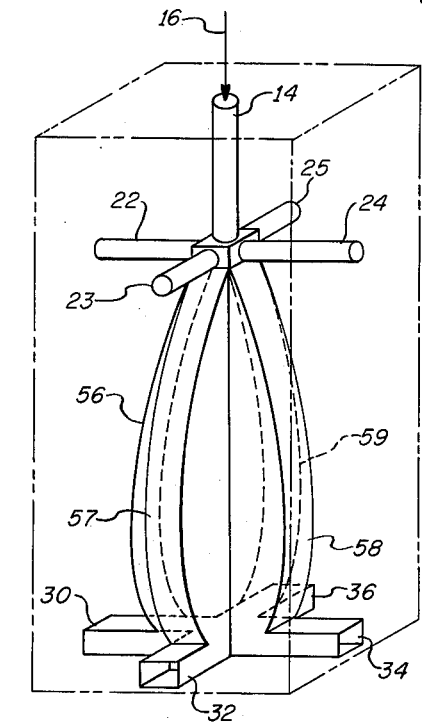
Figure 6:
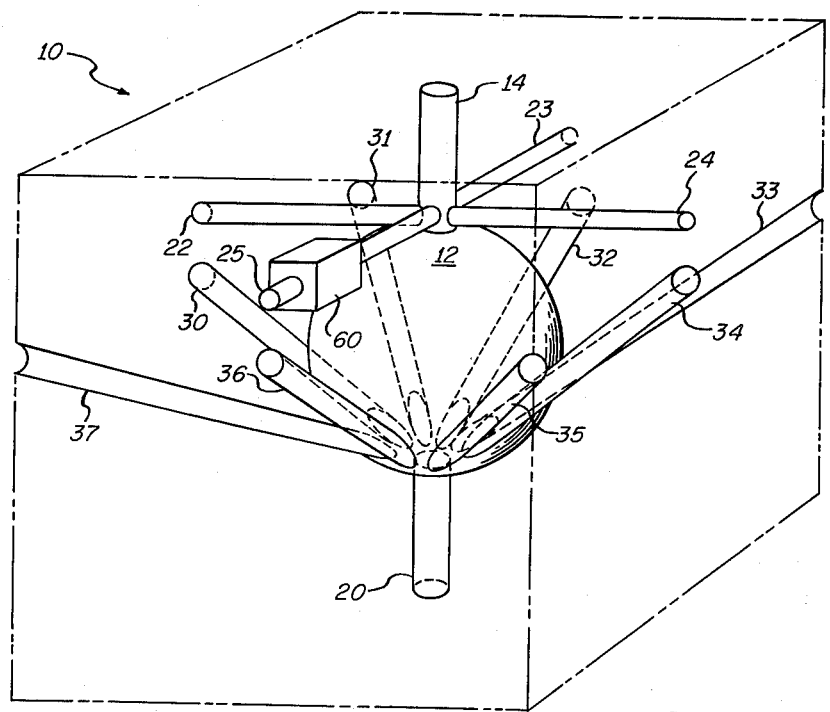
Figure 7:
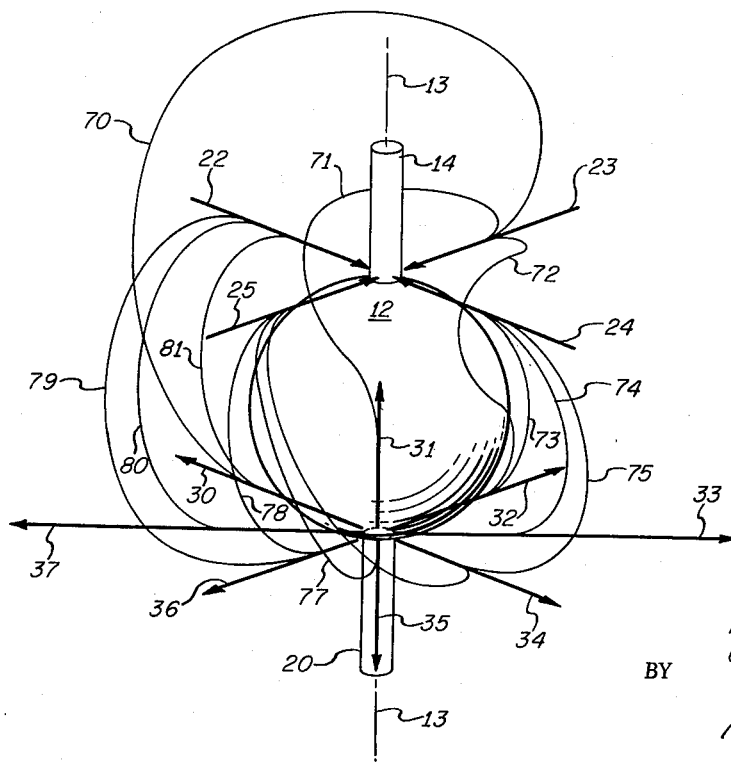

These and other objects will become apparent by referring to the drawings of which, FIG. 1 is a schematic in perspective and partly in phantom of an embodiment of a fluid control apparatus having a spherical cavity, FIG. 2 is a section taken along lines 2—2 of FIG. 1 to explain the operation of the present invention, FIG. 3 is a view taken along lines 3—3 of FIG. 2 showing an embodiment of the present invention including feedback connections, FIG. 4 is a sectional view of another embodiment of a fluid control apparatus having an ellipsoidal cavity, FIG. 5 is a schematic in perspective of a further embodiment of a fluid control apparatus having a channelized ellipsoidal cavity, FIG. 6 is a schematic view of a fluid control apparatus utilized as an inverter, and FIG. 7 is a schematic view of an additional embodiment of the present invention utilized as an oscillator or pulse generator.

The embodiment of the fluid control apparatus 10 shown in FIG. 1 includes an element 11 that has disposed therein a spherical cavity 12 having an axis 13. An inlet conduit 14 is also disposed within the element 11 and communicates by means of an orifice 15 with the cavity 12. In the embodiment shown, the longitudinal axis of the conduit 14 is coincident with the axis 13. A primary or working fluid 16 is adapted to flow through the inlet conduit 14 and into the cavity 12 in the direction of the axis 13. An outlet or exhaust conduit 20 having an outlet orifice 21 in the cavity 12 is disposed diametrically opposed to the inlet orifice 15 along the axis 13 in order that, in the absence of any forces being applied to the working fluid 16, the fluid 16 will be introduced into the cavity 12 through the inlet conduit 14 and orifice 15 and exhausted through the outlet orifice 21 and conduit 20.

In order to control the direction of flow of the working fluid 16 within the cavity 12, four control conduits 22, 23, 24 and 25 are disposed within the element 11 with their respective longitudinal axes perpendicular to the axis 13 and spaced 90° with respect to each other. Control signal fluid is selectively adapted to flow through selected control signal conduits to control the direction of flow of the working fluid 16 within the cavity 12 in a manner to be more fully explained.

The control signal fluid flowing through the control conduits 22, 23, 24 and 25 issues from respective orifices 26, 27, 28 and 29 which are disposed near the lower end of the inlet conduit 14 and located 90° apart with respect to each other. By this arrangement the control conduits 22, 23, 24 and 25 are in communication with the cavity 12 and the control fluid entering at right angles to the direction of flow of the working fluid 16 deflects the working fluid 16 thereby forming a vortex within the spherical cavity 12 in a manner to be more fully explained. It will be understood that the inlet conduit 14 connects to a suitable source of working fluid 16 while the signal conduits 22, 23, 24 and 25 connect to sources of control signal fluid neither of which are shown for purposes of simplicity.

Eight output conduits 30–37 are also disposed within the element 11 and provide paths by means of their respective outlet orifices 40–47 for the working fluid 16 and the control signal fluid to exhaust in a manner to be explained. The orifices 40–47 are symmetrically located at 45° intervals around the axis 13 near the exhaust orifice 31 but in spaced relation thereto. The output conduits 30–37 may be connected to provide outputs to other apparatus not shown, for example, to respective control signal conduits of other elements similar to 10. The outlet orifices 40, 42, 44 and 46 are disposed in respective planes containing control orifices 26, 27, 28 and 29 and including the axis 13. The orifices 41, 43, 45 and 47 are disposed in respective planes including the axis 13 that are half way between the planes described above containing the orifices 40, 42, 44 and 46.

Referring now to FIG. 2 the principle of operation of the fluid control device 10 will be explained in terms of two dimensions for purposes of simplicity. The working fluid 16 flows through the inlet conduit 14 and, in the absence of control signal fluid flow, continues through the cavity 12 and is exhausted through the outlet or exhaust conduit 20. With control signal fluid flowing through a control conduit, for example, 22 in the direction indicated by the arrows toward the axis 13, the working fluid 16 is deflected to the right as viewed in the drawing. The combination of the control signal fluid acting upon the working fluid 16 and the shape of the spherical cavity 12 causes a vortex of rotating fluid to be established within the cavity 12 as indicated by the arrows in the plane which includes the axis 13 and the longitudinal axes of the orifices 15, 26 and 40. A portion of the vortex of rotating fluid is exhausted through the output orifice and output conduit 30 in the direction indicated by the arrows to provide a fluid output signal.

Depending upon the differential pressure between the working fluid and control signal fluid and on the respective sizes of the orifices and conduits, an amplification effect may be provided with respect to the control signal fluid input and the fluid output signal. The amplification A may be defined as the mass $M_o$ of fluid ducted from the output conduit 30 divided by the mass $M_i$ of the fluid ducted into the control signal conduit 22, i.e., $$A = \frac{M_o}{M_i}$$

With the configuration shown in FIGS. 1 and 2, a vortex of rotating fluid causes a significantly larger output to occur from one of the output conduits, for example, 30 as illustrated by the arrows in FIG. 2.

The embodiment of the invention shown in FIG. 1 may be utilized as a digital logic "AND" circuit by providing control signal inputs through two control signal conduits simultaneously in the following manner. Assume equal fluid control signal inputs through control conduits 22 and 23 simultaneously. The resultant force vector of the control signal fluid flow from the conduits 22 and 23 impinges upon the working fluid 16 and causes the working fluid 16 to deflect and produce a vortex in the plane which bisects the control conduits 22 and 23 and includes the axis 13. The resultant output signal due to this vortex will be from the output conduit 31. Similarly, simultaneous equal inputs through control conduits 23 and 24 will result in an output from output conduit 33 and so on. Thus, logic functions can be defined for this device and it may be used as a logic element for digital computers as follows: if signal A is applied to conduit 22, signal B applied to conduit 23, signal $\bar{A}$ applied to conduit 24 and signal $\bar{B}$ applied to conduit 25 the following table will indicate the logical binary outputs.

| Input | Output |
|---|---|
| 22=A    23=B | 31=A·B |
| 24=$\bar{A}$    23=B | 33=$\bar{A}$·B |
| 24=$\bar{A}$    25=$\bar{B}$ | 35=$\bar{A}$·$\bar{B}$ |
| 22=A    25=$\bar{B}$ | 37=A·$\bar{B}$ |

Thus, binary functions in the form of control signal fluid inputs result in "AND" output functions in the form of fluid flow from predetermined output conduits.

Although the embodiment of the invention shown in FIG. 1 has the control conduits and the output conduits disposed in a predetermined manner as described, it will be obvious that they may be disposed other than shown depending upon the desired function to be performed by the element 11.

Referring now to FIG. 3, regenerative feedback is provided by adding to the embodiment of FIGURE 1 feedback conduits 51 and 52 which provide flexibility in controlling and shaping the vortex as indicated by the arrows emanating from the feedback conduits 51 and 52. The vortex shown in FIG. 3 is being sustained by regeneratively feeding back a portion of the output signal from the output conduits 36. It will be obvious that degenerative as well as other types of feedback provide considerable flexibility in controlling and changing the rotating vortex.

Although the element 11 has been shown in FIG. 1 as a solid element for purposes of simplicity, it would normally be manufactured from a plurality of parts. For example, one method that has been used successfully is to manufacture the element 11 in two halves in order that the cavity 12 and the conduits may be easily formed therein. The two halves that comprise the element 11 are then secured together to form an integral unit.

Referring now to FIG. 4, a fluid control device 10 is shown having a cavity 55 substantially in the form of an ellipsoid. The advantage of this arrangement is that the rotating vortex established within the ellipsoidal cavity 55 can be controlled to cause the fluid output to exit from the cavity 55 at an angle up to 90° with respect to the axis 13 as shown by the dotted arrows. This configuration may be utilized to steer a navigable craft by reaction forces. For example, with the fluid flow exiting from the fluid control device 10 at an angle up to 90° from the axis 13, the device 10 may be used as a steering device by means of vector control. The energy of the mass flow of the output fluid may be used to exert reaction forces against the device 10 and any body to which it is attached. Thus, by having an input control conduit means for providing signals, for example, in four directions; an output fluid flow can be provided which will vary in direction in response to the signal input thereby providing reaction forces against the body to which the device 10 is attached in a plurality of predetermined directions. In view of the example given above with respect to the embodiment of FIG. 1, it will be obvious that the embodiment of FIG. 4 may also be utilized as a universal logic element.

The embodiment of the present invention shown in FIG. 5 is based upon the principles disclosed above with respect to FIG. 4 while further including ellipsoidal channels 56, 57, 58 and 59 associated with respective control signal conduits 22, 23, 24 and 25. The channels 56 to 59 provide greater directivity of the rotating vortex with respect to a particular output conduit with which it is cooperative and in communication.

Depending upon the function to be performed by the element 11, the channels 56 to 59 may be relatively deep as shown in FIG. 5 or they may be relatively shallow to assist in defining the flow path of the working fluid 16 and to aid in controlling the degree of turbulence in the working fluid.

FIG. 6 shows an embodiment of the present invention utilized as an inverter in which a steady fluid flow is applied through the inlet conduit 14 and a steady control signal flow through the control conduit 24. By applying a modulating or varying fluid signal through the control conduit 25 by means of a modulating device 60, a modulated fluid output signal will be produced through the output conduit 34 thereby in effect converting a steady fluid input to a pulsed or modulated fluid output.

Referring now to FIG. 7, an embodiment of the present invention is shown which may be utilized as an oscillator or fluid pulse generator. Regenerative feedback conduits are provided by connecting output conduits 30, 31 and 32 to the control signal conduit 23 by means of respective feedback conduits 70, 71 and 72; connecting output conduits 32, 33 and 34 to control signal 24 by means of respective feedback conduits 73, 74 and 75; connecting output conduits 34, 35 and 36 to control signal conduit 25 by means of respective feedback conduits 76, 77 and 78 and connecting output conduits 36, 37 and 30 to control signal conduit 22 by means of respective feedback conduits 79, 80 and 81.

In operation, with a working fluid applied through the input conduit 14 and a single input fluid pulse applied through control conduit 22, for example, the regenerative feedback provided through the feedback conduits will cause feedback forces to be applied to the rotating vortex established by the initial pulse which results in precession of the vortex. When this occurs the regenerative feedback is applied through a control conduit in a direction 90° away from the initial pulse and, therefore, perpendicular to the rotating vortex. The rotating vortex acts in a manner similar to a gyroscope in that the regenerative feedback force is effectively applied 90° away and in the direction of rotation of the vortex and thus causes the vortex to precess within the cavity 12. As the vortex precesses within the cavity 12, the regenerative feedback is sequentially applied at the next control conduit thereby causing the vortex to continue to precess within the cavity 12. This sequential regenerative feedback causes the vortex to continue to precess within the cavity 12 and pulses of output fluid are provided sequentially from the output conduits. The device 10 will continue to oscillate as long as working fluid 16 is applied through the inlet conduit 14 thereby providing oscillator operation or it may be utilized as a fluid pulse generator.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:
1. A fluid control device comprising
 (1) an element having disposed therein a cavity having an axis,
 (2) a working fluid flowing through said element and into said cavity in the direction of said axis,
 (3) a control signal fluid selectively adapted to flow through said element for selectively controlling the direction of the flow of said working fluid radially with respect to said axis in one of a plurality of directions,
 (4) said control signal fluid flow and said cavity being cooperative to define the direction and path of said working fluid flow in any one of a plurality of planes which include said axis,
 (5) and fluid outlet means in communication with said cavity and disposed in a predetermined plurality of planes which includes said axis through which said working fluid is selectively controlled to flow in accordance with the flow of said control signal fluid,
 (6) said cavity being substantially in the form of a figure of revolution having an axis of symmetry coincident with said axis and further including channels within said cavity defining at least a portion of said planes.
2. A fluid control device comprising
 (1) means defining a cavity having an axis,
 (2) fluid inlet means through which a first fluid to be controlled flows into said cavity in the direction of said axis,
 (3) fluid outlet means in communication with said cavity and disposed in a plurality of planes which include said axis and in spaced cooperative relation with respect to said fluid inlet means, and
 (4) control conduit means disposed in a plurality of planes which include said axis through which control fluid is selectively adapted to flow for controlling the direction of the flow of said first fluid within said cavity,
 (5) said fluid inlet and outlet means, said control conduit means and said cavity being so constructed and relatively arranged as to cooperatively control the flow of said first fluid in a predetermined plane which includes said axis in accordance with the flow of said control fluid,
 (6) said cavity being substantially in the form of a figure of revolution having an axis of symmetry coincident with said axis and further including channels within said cavity defining at least a portion of said planes.
3. A fluid control device comprising
 (1) an element having disposed therein a cavity having an axis,
 (2) primary conduit means within said element communicating with said cavity through which a working fluid flows into said cavity in the direction of said axis,
 (3) a plurality of control signal conduit means through which control signal fluid is selectively adapted to flow for selectively directing said control signal fluid to deflect said working fluid with respect to said axis in one of a plurality of directions,
 (4) said control signal fluid flow and the surface defining said cavity being cooperative to define the direction and path of said working fluid flow in any one of a plurality of predetermined planes which include said axis,
 (5) a plurality of fluid flow outlet means in spaced relationship with said primary conduit means and in communication with said cavity disposed in said predetermined planes and so constructed and arranged that said working fluid is selectively controlled to flow therethrough in accordance with the direction of the resultant flow of said control signal fluid,
 (6) said cavity further including channels disposed in said predetermined planes for further defining the fluid flow path of said working fluid.
4. A fluid control device as recited in claim 3 in which said channels are of a depth to assist in defining the flow path of said working fluid and to control the degree of turbulence with respect to said working fluid flow.
5. A fluid control device comprising
 (1) an element having disposed therein a cavity having an axis,
 (2) primary conduit means within said element communicating with said cavity through which a working fluid flows into said cavity in the direction of said axis,
 (3) a plurality of control signal conduit means through which control signal fluid is selectively adapted to flow for selectively directing said control signal fluid to deflect said working fluid with respect to said axis in one of a plurality of directions,
 (4) said control signal fluid flow and the surface defining said cavity being cooperative to define the direction and path of said working fluid flow in any one of a plurality of predetermined planes which include said axis,
 (5) a plurality of fluid flow outlet means in spaced relationship with said primary conduit means and in communication with said cavity disposed in said predetermined planes and so constructed and arranged that said working fluid is selectively controlled to flow therethrough in accordance with the direction of the resultant flow of said control signal fluid,
 (6) said working fluid being controlled by said control signal fluid and the shape of said cavity to form a vortex within said cavity in the plane of said resultant direction of said control signal fluid flow for providing an output signal from a predetermined fluid outlet means lying in the plane defined by said vortex, and
 (7) feedback conduit means in communication with said cavity for feeding back a portion of said output signal in a manner to vary said vortex in which said feedback means causes precession of said vortex for providing output signals from said output conduits sequentially.
6. A fluid control device comprising

(1) an element having disposed therein a cavity having an axis,
(2) a working fluid flowing through said element and into said cavity in the direction of said axis,
(3) a control signal fluid selectively adapted to flow through said element for selectively controlling the direction of the flow of said working fluid radially with respect to said axis in one of a plurality of directions,
(4) said control signal fluid flow and said cavity being cooperative to define the direction and path of said working fluid flow in any one of a plurality of planes which include said axis,
(5) and fluid outlet means in communication with said cavity and disposed in a predetermined plurality of planes which include said axis through which said working fluid is selectively controlled to flow in accordance with the flow of said control signal fluid,
(6) said cavity being substantially in the form of an ellipsoid having an axis of symmetry coincident with said axis.

7. A fluid control device comprising
(1) an element having disposed therein a cavity having an axis,
(2) a working fluid flowing through said element and into said cavity in the direction of said axis,
(3) a control signal fluid selectively adapted to flow through said element for selectively controlling the direction of the flow of said working fluid radially with respect to said axis in one of a plurality of directions,
(4) said control signal fluid flow and said cavity being cooperative to define the direction and path of said working fluid flow in any one of a plurality of planes which include said axis,
(5) and fluid outlet means in communication with said cavity and disposed in a predetermined plurality of planes which include said axis through which said working fluid is selectively controlled to flow in accordance with the flow of said control signal fluid,
(6) said cavity being substantially in the form of a sphere.

8. A fluid control device comprising
(1) means defining a cavity having an axis,
(2) fluid inlet means through which a first fluid to be controlled flows into said cavity in the direction of said axis,
(3) fluid outlet means in communication with said cavity and disposed in a plurality of planes which include said axis and in spaced cooperative relation with respect to said fluid inlet means, and
(4) control conduit means disposed in a plurality of planes which include said axis through which control fluid is selectively adapted to flow for controlling the direction of the flow of said first fluid within said cavity,
(5) said fluid inlet and outlet means, said control conduit means and said cavity being so constructed and relatively arranged as to cooperatively control the flow of said first fluid in a predetermined plane which includes said axis in accordance with the flow of said control fluid,
(6) said cavity being substantially in the form of an ellipsoid having an axis of symmetry coincident with said axis.

9. A fluid control device comprising
(1) means defining a cavity having an axis,
(2) fluid inlet means through which a first fluid to be controlled flows into said cavity in the direction of said axis,
(3) fluid outlet means in communication with said cavity and disposed in a plurality of planes which include said axis and in spaced cooperative relation with respect to said fluid inlet means, and
(4) control conduit means disposed in a plurality of planes which include said axis through which control fluid is selectively adapted to flow for controlling the direction of the flow of said first fluid within said cavity,
(5) said fluid inlet and outlet means, said control conduit means and said cavity being so constructed and relatively arranged as to cooperatively control the flow of said first fluid in a predetermined plane which includes said axis in accordance with the flow of said control fluid,
(6) said cavity being substantially in the form of a sphere.

10. A fluid control device comprising
(1) an element having disposed therein a cavity having an axis,
(2) primary conduit means within said element communicating with said cavity through which a working fluid flows into said cavity in the direction of said axis,
(3) a plurality of control signal conduit means through which control signal fluid is selectively adapted to flow for selectively directing said control signal fluid to deflect said working fluid with respect to said axis in one of a plurality of directions,
(4) said control signal fluid flow and the surface defining said cavity being cooperative to define the direction and path of said working fluid flow in any one of a plurality of predetermined planes which include said axis, and
(5) a plurality of fluid flow outlet means in spaced relationship with said primary conduit means and in communication with said cavity disposed in said predetermined planes and so constructed and arranged that said working fluid is selectively controlled to flow therethrough in accordance with the direction of the resultant flow of said control signal fluid,
(6) said cavity being substantially in the form of an ellipsoid having its axis of symmetry coincident with said axis and said working fluid and said control signal fluid being introduced into said ellipsoid at one end thereof along said axis and being exhausted at the other end thereof radially with respect to said axis.

11. A fluid control device comprising
(1) an element having disposed therein a cavity having an axis,
(2) primary conduit means within said element communicating with said cavity through which a working fluid flows into said cavity in the direction of said axis,
(3) a plurality of control signal conduit means through which control signal fluid is selectively adapted to flow for selectively directing said control signal fluid to deflect said working fluid with respect to said axis in one of a plurality of directions,
(4) said control signal fluid flow and the surface defining said cavity being cooperative to define the direction and path of said working fluid flow in any one of a plurality of predetermined planes which include said axis,
(5) a plurality of fluid flow outlet means in spaced relationship with said primary conduit means and in communication with said cavity disposed in said predetermined planes and so constructed and arranged that said working fluid is selectively controlled to flow therethrough in accordance with the direction of the resultant flow of said control signal fluid.
(6) said working fluid being controlled by said control signal fluid and the shape of said cavity to form a vortex within said cavity in the plane of said resultant direction of said control signal fluid flow for providing an output signal from a predetermined fluid outlet means lying in the plane defined by said vortex, and (7) feedback conduit means in communication with said cavity for feeding back a portion of said output signal in a manner to vary said vortex.

12. A fluid control device as recited in claim 11 in which said feedback signal is introduced regeneratively.

13. A fluid control device as recited in claim 11 in which said feedback signal is introduced degeneratively.

References Cited by the Examiner

UNITED STATES PATENTS

| 1,381,095 | 6/21 | Starr | 239—468 XR |
| 2,893,432 | 7/59 | Gibson | 138—42 XR |
| 3,024,805 | 3/62 | Horton | 137—597 |
| 3,124,160 | 3/64 | Zilberfarb | 137—81.5 |

LAVERNE D. GEIGER, *Primary Examiner.*